US009007330B2

(12) United States Patent
Kimura et al.

(10) Patent No.: US 9,007,330 B2
(45) Date of Patent: Apr. 14, 2015

(54) TOUCH PANEL INCLUDING A WIRING SUBSTRATE DISPOSED BETWEEN A PAIR OF SUBSTRATES AND A METHOD FOR PRODUCING THE SAME

(75) Inventors: Kiyohiro Kimura, Miyagi (JP); Kazuhiro Miura, Miyagi (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 12/596,718

(22) PCT Filed: Jan. 29, 2009

(86) PCT No.: PCT/JP2009/051411
§ 371 (c)(1),
(2), (4) Date: Oct. 20, 2009

(87) PCT Pub. No.: WO2009/104461
PCT Pub. Date: Aug. 27, 2009

(65) Prior Publication Data
US 2010/0128001 A1    May 27, 2010

(30) Foreign Application Priority Data

Feb. 20, 2008    (JP) ................................ 2008-039038

(51) Int. Cl.
*G06F 3/045*    (2006.01)
(52) U.S. Cl.
CPC ...................................... *G06F 3/045* (2013.01)
(58) Field of Classification Search
None
See application file for complete search history.

(56) References Cited

U.S. PATENT DOCUMENTS

| 6,356,259 | B1 * | 3/2002 | Maeda et al. | ................. 345/173 |
| 2005/0099402 | A1 * | 5/2005 | Nakanishi et al. | ............ 345/173 |
| 2005/0184969 | A1 * | 8/2005 | Dunn et al. | .................... 345/173 |

FOREIGN PATENT DOCUMENTS

| JP | 2002-175155 | 6/2002 |
| JP | 2002-182854 | 6/2002 |
| JP | 2002175155 A * | 6/2002 |

OTHER PUBLICATIONS

International Search Report dated Apr. 24, 2009, for corresponding Patent Application PCT/JP2009/051411.

* cited by examiner

*Primary Examiner* — Alexander S Beck
*Assistant Examiner* — Kirk Hermann
(74) *Attorney, Agent, or Firm* — K&L Gates LLP (57) ABSTRACT

A touch panel and a method of producing the touch panel are provided in which a touch panel having a gap between two transparent substrates that is uniform in a plane can stably be obtained by setting a gap between the two transparent substrates in an area where a wiring substrate is disposed to a desired gap. A touch panel includes a pair of transparent substrates opposed to and away from each other and connection terminals provided on at least one of opposed surfaces of the pair of transparent substrates. A wiring substrate that is disposed between the pair of transparent substrates and has one surface electrically connected to the connection terminals and the other surface disposed away from one of the transparent substrates opposed to the other transparent substrate on which the connection terminals are provided. An insulating layer provided in a gap between the pair of transparent substrates in an area where the wiring substrate is disposed in a state where the wiring substrate and the connection terminals are connected.

5 Claims, 9 Drawing Sheets

TOUCH PANEL INCLUDING A WIRING SUBSTRATE DISPOSED BETWEEN A PAIR OF SUBSTRATES AND A METHOD FOR PRODUCING THE SAME

CROSS REFERENCE TO RELATED APPLICATIONS

The present application is a National Stage of International Application No. PCT/JP2009/051411 filed on Jan. 29, 2009 and which claims priority to Japanese Patent Application No. 2008-039038 filed on Feb. 20, 2008, the entire contents of which are being incorporated herein by reference.

BACKGROUND

The present disclosure relates to a touch panel used in a screen-input-type display apparatus and the like and a method of producing the touch panel.

For example, a touch panel of an analog resistive film system that detects input coordinates based on an amount of a resistance change includes a pair of an upper transparent substrate and a lower transparent substrate that are opposed to each other with a predetermined gap therebetween, resistive films provided on opposed surfaces of the pair of the transparent substrates, connection terminals electrically connected to the resistive films, and a wiring substrate electrically connected to the connection terminals. In the touch panel, a coordinate value is detected based on a resistance value between the resistive films that are brought into contact with each other by a pressing force applied from one substrate surface, and an output terminal.

The connection terminal electrically connected to each of the resistive films that are provided on the transparent substrates is provided on, for example, the same substrate as the transparent substrate on which the resistive film to be connected is provided. That is, the upper connection terminal is provided on the upper transparent substrate, and the lower connection terminal is provided on the lower transparent substrate. Patent Document 1 discloses a terminal structure in which the upper connection terminal and the lower connection terminal are not superimposed in plan view. The upper connection terminal and the lower connection terminal are connected to one surface side and the other surface side of the wiring substrate by bonding, respectively. Further, it is also structured by performing bonding between the wiring substrate and the transparent substrates in the same layer as a bonding layer such as an anisotropic conductive film that connects the wiring substrate and the connection terminals by bonding.

Patent Document 1: Japanese Patent Application Laid-open No. 2002-182854 (paragraphs [0012] and [0040] to [0042], FIG. 1)

However, in a case where the upper connection terminal and the lower connection terminal are not superimposed in plan view and the upper connection terminal and the lower connection terminal are connected to one surface side and the other surface side of the wiring substrate by bonding, respectively, there are generated air gaps between the wiring substrate and the transparent substrates, and therefore a gap formed between the two transparent substrates in an area where the wiring substrate is disposed cannot be kept to a desired thickness. As a result, the gap formed between the substrates cannot be made uniform in the substrate plane, which causes a problem that Newton's rings and inputting errors of a touch panel occur.

Moreover, even when the transparent substrates and the wiring substrate are bonded by the bonding layer such as an anisotropic conductive film that bonds the wiring substrate and the connection terminals so as to fill a space between the transparent substrate opposed to the transparent substrate on which the connection terminals are provided and the wiring substrate, it is difficult to stably produce a touch panel such that a gap between the two transparent substrates in the area where the wiring substrate is disposed is always kept constant, due to variation in thicknesses of the wiring substrate, the bonding layer, the connection terminal, and the like, which still causes a case where Newton's rings and inputting errors occur.

SUMMARY

The present embodiments provide a touch panel and a method of producing the touch panel, in which a touch panel having a gap between two transparent substrates that is uniform in the plane can stably be obtained by setting the gap between the two transparent substrates in an area where a wiring substrate is disposed to a desired gap.

According to an embodiment, there is provided a touch panel including a pair of transparent substrates, connection terminals, a wiring substrate, and an insulating layer.

The pair of transparent substrates are opposed to and away from each other. The connection terminals are provided on at least one of opposed surfaces of the pair of transparent substrates. The wiring substrate is disposed between the pair of transparent substrates. One surface of the wiring substrate is electrically connected to the connection terminals and the other surface of the wiring substrate is disposed away from one of the transparent substrates opposed to the other transparent substrate on which the connection terminals are provided. The insulating layer is provided in a gap between the pair of transparent substrates in an area where the wiring substrate is disposed in a state where the wiring substrate and the connection terminals are connected.

According to the touch panel described above, in areas corresponding to the connection terminals of the wiring substrate before the insulating layer is provided, one of the transparent substrates opposed to the other transparent substrate on which the corresponding connection terminals are provided and the wiring substrate are spaced away from each other. That is, because in the areas corresponding to the connection terminals of the wiring substrate, the wiring substrate is firmly fixed to only the transparent substrate side on which the corresponding connection terminals are provided, and is not firmly fixed to the other substrate, it is possible to control the gap between the pair of transparent substrates in the area where the wiring substrate is disposed to a desired gap. Accordingly, because it is possible to fix the gap to the desired gap by providing the insulating layer while keeping the gap between the pair of transparent substrates in the area where the wiring substrate is disposed to the desired gap, the gap between the pair of transparent substrates can be made uniform in the plane of the touch panel, Newton's rings and inputting errors can be prevented from occurring, and a touch panel of an excellent quality can be obtained. Further, because it is possible to fix the gap to the desired gap by providing the insulating layer while keeping the gap between the pair of transparent substrates in the area where the wiring substrate is disposed to the desired gap, a touch panel having a gap between the pair of transparent substrates that is uniform in the plane of the touch panel can stably be obtained even when a thickness of the wiring substrate, a thickness of the connection terminals, and a thickness of the bonding layer that bonds the wiring substrate and the connection terminals are varied.

The touch panel may further include a frame-like bonding layer that is disposed between the pair of transparent substrates and bonds the pair of transparent substrates to each other. The bonding layer includes, at an outer peripheral portion thereof, a notch portion corresponding to the wiring substrate, and the insulating layer is provided in a space formed by the pair of transparent substrates and the notch portion of the bonding layer.

Accordingly, the space in a peripheral portion between the pair of transparent substrates can be filled by the bonding layer and the insulating layer, and it is possible to prevent water from penetrating from an outside and the connection terminals from being corroded due to water.

The connection terminals may be a first connection terminal and a second connection terminal that are provided on the respective opposed surfaces of the pair of transparent substrates and are not superimposed with each other in plan view. The wiring substrate may be divided into a first connection area that is connected to the first connection terminal and a second connection area that is connected to the second connection terminal.

As described above, in the case where the connection terminals are provided on the pair of respective transparent substrates, by dividing the wiring substrate into the first connection area and the second connection area, it is possible to bond the connection terminals provided on the different transparent substrates and the wiring substrate in the different, inconsecutive connection areas. Accordingly, because the wiring substrate is not pulled at a time of pressure-bonding connection of the connection terminals and the wiring substrate, a connection failure between the connection terminals and the wiring substrate, which is caused due to a positional deviation caused by the wiring substrate being pulled, can be prevented from occurring.

The touch panel can be a resistive touch panel.

Accordingly, it is possible to obtain a resistive touch panel of an excellent quality, which can prevent occurrence of Newton's rings and inputting errors.

According to an embodiment, there is provided a method of producing a touch panel, including a step of disposing a wiring substrate between a pair of transparent substrates provided with connection terminals. The wiring substrate and the connection terminals are electrically connected. By filling an insulating material between the pair of transparent substrates in an area where the wiring substrate is disposed and curing the insulating material, an insulating layer is formed.

In areas corresponding to the connection terminals of the wiring substrate before the insulating layer is provided, one of the transparent substrates opposed to the other transparent substrate on which the corresponding connection terminals are provided and the wiring substrate are spaced away from each other. That is, because in the areas corresponding to the connection terminals of the wiring substrate, the wiring substrate is firmly fixed to only the transparent substrate side on which the corresponding terminals are provided, and is not firmly fixed to the other substrate, it is possible to control the gap between the pair of transparent substrates in the area where the wiring substrate is disposed to a desired gap. Accordingly, because it is possible to fix the gap to the desired gap by providing the insulating layer while keeping the gap between the pair of transparent substrates in the area where the wiring substrate is disposed to the desired gap, the gap between the pair of transparent substrates can be made uniform in the plane of the touch panel, Newton's rings and inputting errors can be prevented from occurring, and a touch panel of an excellent quality can be produced. Further, because it is possible to fix the gap to the desired gap by providing the insulating layer while keeping the gap between the pair of transparent substrates in the area where the wiring substrate is disposed to the desired gap, a touch panel having a gap between the pair of transparent substrates that is uniform in the plane of the touch panel can stably be produced even when a thickness of the wiring substrate, a thickness of the connection terminals, and a thickness of the bonding layer that bonds the wiring substrate and the connection terminals are varied.

According to the present embodiments, a touch panel having a gap between a pair of transparent substrates that is uniform in a plane of a touch panel can stably be obtained.

Additional features and advantages are described herein, and will be apparent from, the following Detailed Description and the figures.

DETAILED DESCRIPTION

Hereinafter, a touch panel according to an embodiment will be described with reference to FIGS. 1 to 4 and 7. A touch panel is used as a screen-input display apparatus by being overlaid on a display apparatus such as a liquid crystal panel and an EL panel. By pressing the touch panel, selection and the like of display on a display screen of the screen-input display apparatus can directly be performed. In this embodiment, a touch panel of an analog resistive film system is adopted.

Figure 1:
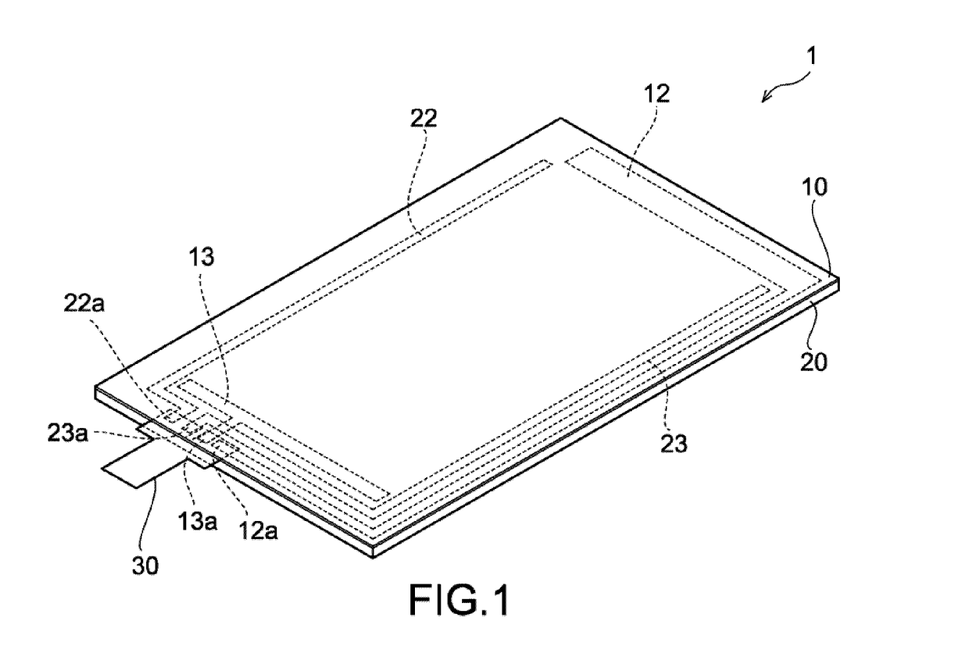
FIG. 1 A perspective view of a touch panel in an embodiment.
Figure 2:
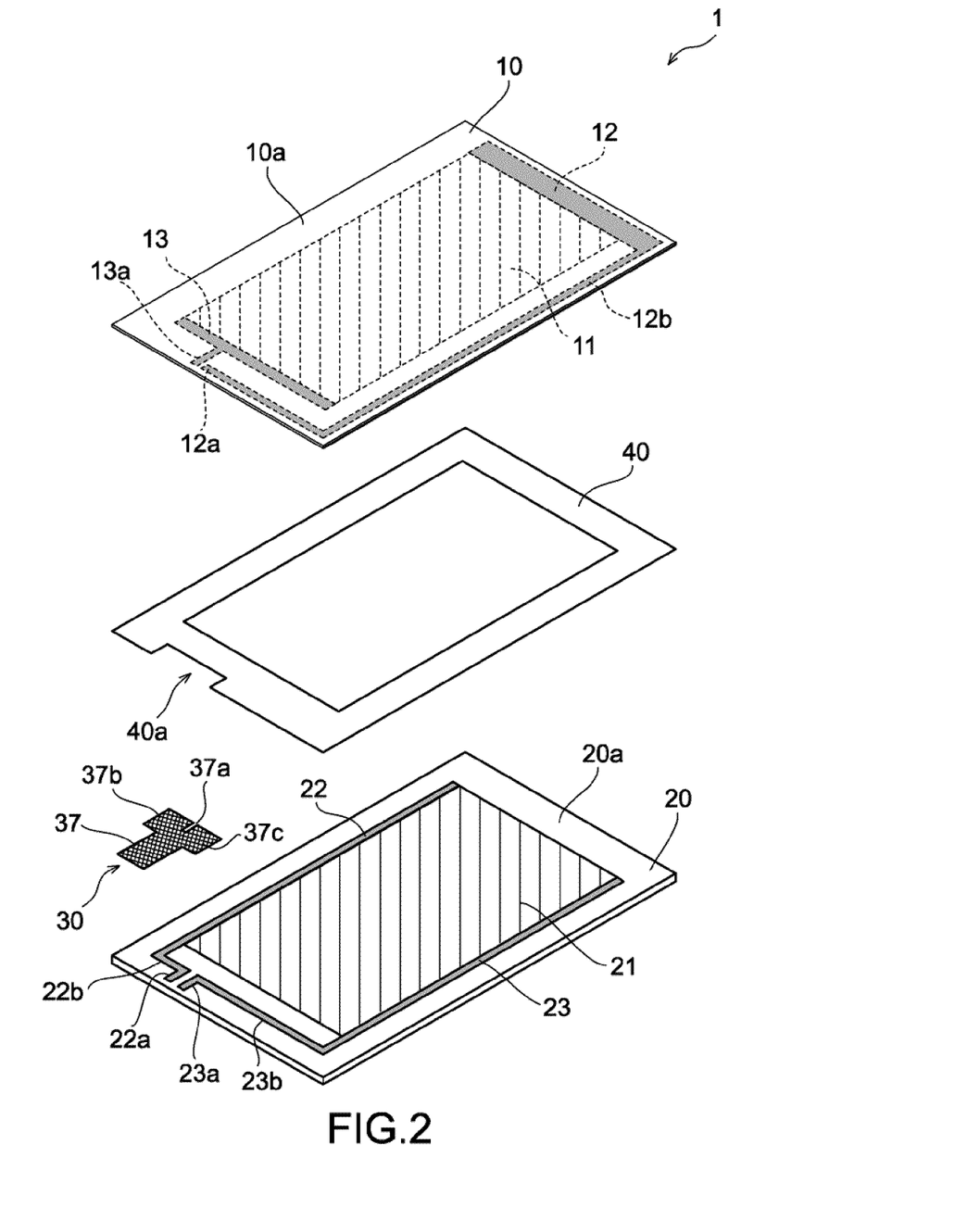
FIG. 2 An exploded perspective view of the touch panel shown in FIG. 1.
Figure 3:
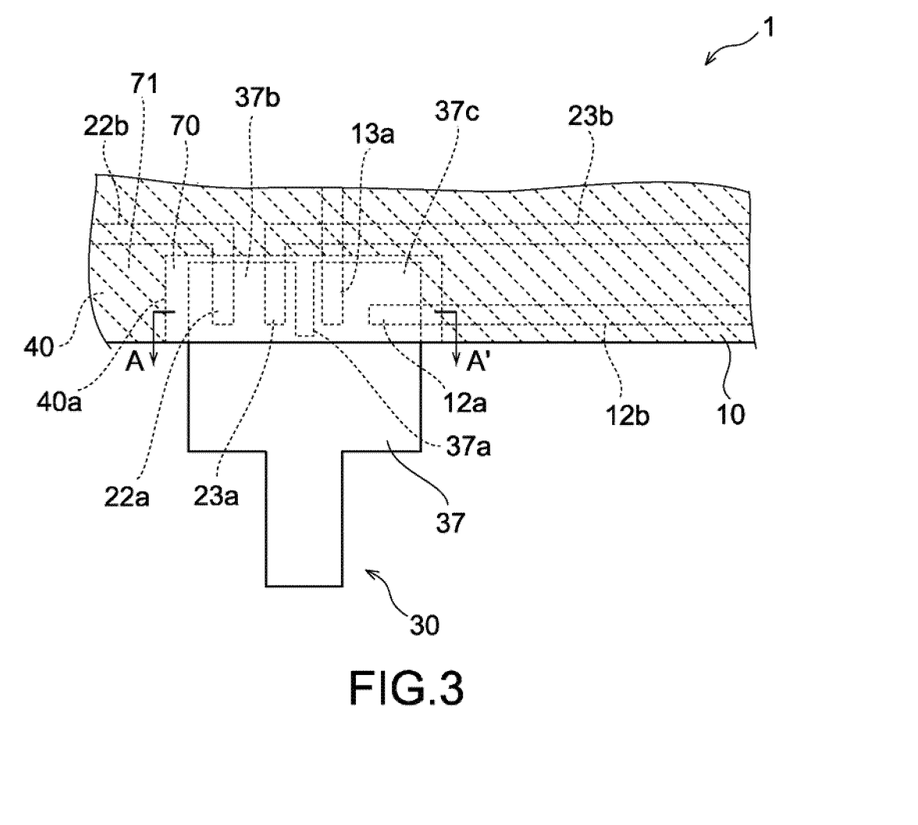
FIG. 3 A partially-enlarged plan view of an area of the touch panel of FIG. 1, to which a flexible printed wiring board is connected.
Figure 4:
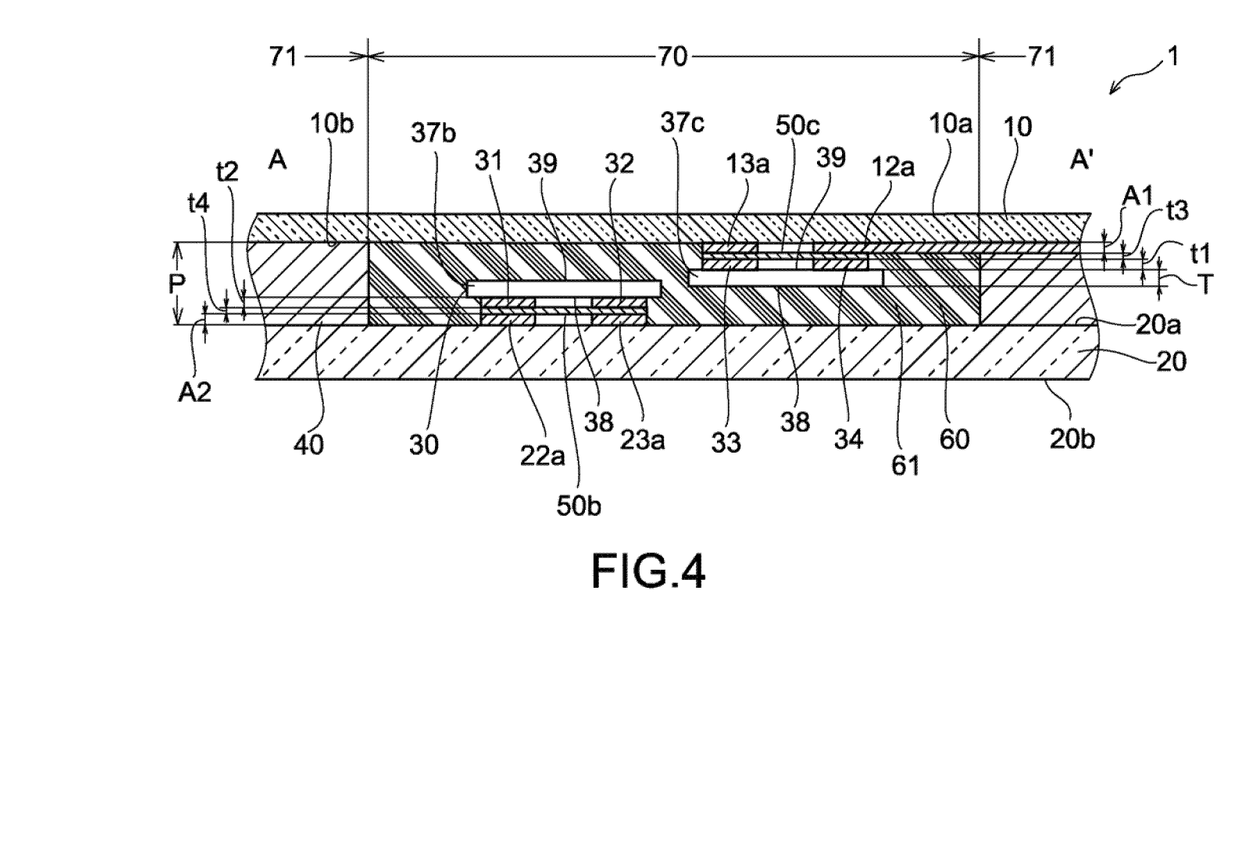
FIG. 4 A cross sectional view taken along the line A-A' of FIG. 3.
Figure 7:
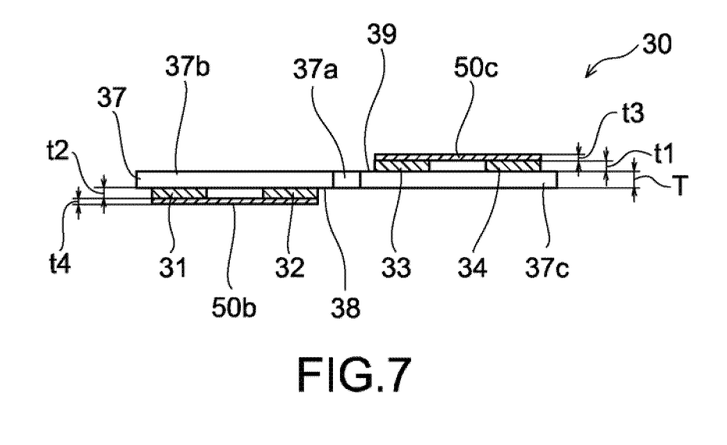
FIG. 7 A cross sectional view showing a state in which ACFs are provided to the flexible printed wiring board.

FIG. 1 is a perspective view of a touch panel 1. FIG. 2 is an exploded perspective view of the touch panel 1. FIG. 3 is a partially-enlarged plan view of an area of the touch panel of FIG. 1, to which a flexible printed wiring board is connected. FIG. 4 is a cross sectional view taken along the line A-A' of FIG. 3. FIG. 7 is a cross sectional view showing a state in which sheet-like anisotropic conductive films (ACF) are provided on the flexible printed wiring board, the cross section having the same cutting direction as in FIG. 4.

As shown in FIGS. 1 and 2, the touch panel 1 includes a pair of a flexible transparent substrate 10 made of soft polyethylene terephthalate (PET) and the like as a rectangular first transparent substrate and a hard transparent glass substrate 20 as a rectangular second transparent substrate, and a flexible printed wiring board 30 as a wiring substrate that is connected to each of the flexible transparent substrate 10 and the transparent glass substrate 20.

The flexible transparent substrate 10 has a first surface 10a and a second surface 10b, and the transparent glass substrate 20 has a first surface 20a and a second surface 20b. The flexible transparent substrate 10 and the transparent glass substrate 20 are disposed opposite to and away from each other with a predetermined gap therebetween such that the second surface 10b and the first surface 20a are opposed to each other, and are bonded at peripheral portions thereof by a frame-like bonding layer 40. The bonding layer 40 is constituted of, for example, a double-sided adhesive tape.

An area surrounded by the bonding layer 40 corresponds to an input area, and in a screen-input display apparatus that uses the touch panel as described above, the area surrounded by the bonding layer 40 becomes an input area and image display area. Further, the flexible transparent substrate 10 side becomes an input side. In this embodiment, though a transparent substrate on a side that does not become the input side is a hard transparent glass substrate, a soft flexible transparent substrate may be used. Furthermore, instead of the hard transparent glass substrate, a hard transparent resin material such as an acrylic plate may be used.

A rectangular transparent resistive film 11 made of indium tin oxide (ITO) is provided over the second surface 10b of the flexible transparent substrate 10. Further, on the second surface 10b of the flexible transparent substrate 10, a first upper electrode 12, a second upper electrode 13, a first upper connection terminal 12a, a second upper connection terminal 13a, and upper wiring 12b are provided. The first upper electrode 12 and the second upper electrode 13 are electrically connected to the transparent resistive film 11 along a pair of opposed short sides of the transparent resistive film 11. The first upper connection terminal 12a is electrically connected to the first upper electrode 12. The second upper connection terminal 13a is electrically connected to the second upper electrode 13. The upper wiring 12b electrically connects the first upper electrode 12 and the first upper connection terminal 12a.

The first upper connection terminal 12a and the second upper connection terminal 13a constitute an upper connection terminal as a first connection terminal according to the embodiment. Further, in this embodiment, each of the first upper electrode 12, the second upper electrode 13, the first upper connection terminal 12a, the second upper connection terminal 13a, and the upper wiring 12b is formed of a metal film made of silver (Ag) or the like.

A rectangular transparent resistive film 21 made of indium tin oxide (ITO) is provided over the first surface 20a of the transparent glass substrate 20. Further, on the first surface 20a of the transparent glass substrate 20, there are provided a first lower electrode 22, a second lower electrode 23, a first lower connection terminal 22a, a second lower connection terminal 23a, first lower wiring 22b, and second lower wiring 23b. The first lower electrode 22 and the second lower electrode 23 are electrically connected to the transparent resistive film 21 along a pair of opposed long sides of the transparent resistive film 21. The first lower connection terminal 23a is electrically connected to the first lower electrode 22. The second lower connection terminal 23a is electrically connected to the second lower electrode 23. The first lower wiring 22b electrically connects the first lower electrode 22 and the first lower connection terminal 22a. The second lower wiring 23b electrically connects the second lower electrode 23 and the second lower connection terminal 23a.

The first lower connection terminal 22a and the second lower connection terminal 23a constitute a lower connection terminal as a second connection terminal according to the present invention. Further, in this embodiment, each of the first lower electrode 22, the second lower electrode 23, the first lower connection terminal 22a, the second lower connection terminal 23a, the first lower wiring 22b, and the second lower wiring 23b is formed of a metal film made of silver (Ag) or the like.

In this embodiment, a longitudinal direction of the first upper electrode 12 and the second upper electrode 13 and a longitudinal direction of the first lower electrode 22 and the second lower electrode 23 are positioned perpendicular to each other in plan view, but are not limited to this.

The first upper connection terminal 12a, the second upper connection terminal 13a, the first lower connection terminal 22a, and the second lower connection terminal 23a are provided at an end portion of the touch panel 1 and are disposed so as not to be superimposed in plan view. Those connection terminals are electrically connected to the flexible printed wiring board 30.

As shown in FIGS. 2 to 4 and 7, the flexible printed wiring board 30 includes a base film 37 having a first surface 39 and a second surface 38, a first upper electrode terminal 34 and a second upper electrode terminal 33 provided on the first surface 39, and a first lower electrode terminal 31 and a second lower electrode terminal 32 provided on the second surface 38. An end portion of the base film 37 is divided into a first connection area 37b and a second connection area 37c by a slit 37a.

The first upper electrode terminal 34 and the second upper electrode terminal 33 are provided in the second connection area 37c. Via an ACF 50c, the first upper electrode terminal 34 is electrically connected to the first upper connection terminal 12a and the second upper electrode terminal 33 is electrically connected to the second upper connection terminal 13a. The first lower electrode terminal 31 and the second lower electrode terminal 32 are provided in the first connection area 37b. Via an ACF 50b, the first lower electrode terminal 31 is electrically connected to the first lower connection terminal 22a and the second lower electrode terminal 32 is electrically connected to the second lower connection terminal 23a.

As shown in FIG. 4, in the first connection area 37b of the flexible printed wiring board 30, the first lower connection terminal 22a and the second lower connection terminal 23a are connected on a side of the second surface 38 as one surface. The first surface 39 as the other surface is spaced apart from the flexible transparent substrate 10 that is opposed to the transparent glass substrate 20 on which the first lower connection terminal 22a and the second lower connection terminal 23a are provided. In other words, when a distance between the second surface 10b of the transparent substrate 10 and the first surface 20a of the transparent glass substrate 20, which is a gap between the substrates, is denoted by P, a thickness of the first lower connection terminal 22a and the second lower connection terminal 23a is denoted by A2, a thickness of the ACF 50b is denoted by t4, a thickness of the first lower electrode terminal 31 and the second lower electrode terminal 32 is denoted by t2, and a thickness of the base film 37 is denoted by T, $$P > A2 + T + t2 + t4$$

is established. That is, a sum of the respective thicknesses of the connection terminals, the wiring substrate, and the ACF is smaller than the inter-substrate distance P.

On the other hand, in the second connection area 37c of the flexible printed wiring board 30, the first upper connection terminal 12a and the second upper connection terminal 13a are connected on a side of the first surface 39 as one surface. The second surface 38 as the other surface is spaced apart from the transparent glass substrate 20 that is opposed to the flexible transparent substrate 10 on which the first upper connection terminal 12a and the second upper connection terminal 13a are provided. In other words, when a distance between the second surface 10b of the transparent substrate 10 and the first surface 20a of the transparent glass substrate 20, which is a gap between the substrates, is denoted by P, a thickness of the first upper connection terminal 12a and the second upper connection terminal 13a is denoted by A1, a thickness of the ACF 50c is denoted by t3, a thickness of the first upper electrode terminal 34 and the second upper electrode terminal 33 is denoted by t1, and a thickness of the base film 37 is denoted by T, $$P > A1 + T + t1 + t3$$

is established. That is, a sum of the respective thicknesses of the connection terminals, the wiring substrate, and the ACF is smaller than the inter-substrate distance P.

It should be noted that the distance P is equal to a thickness a bonding layer 40 that bonds the two transparent substrates and holds the gap between the two transparent substrates 10 and 20. In this embodiment, P is 80 µm, t1 and t2 are 12 µm, t3 and t4 are 25 µm, T is 12 µm, and A1 and A2 are 15 µm.

As shown in FIG. 2, the frame-like bonding layer 40 constituted of a double-sided adhesive tape includes a notch portion 40a at an outer peripheral portion thereof.

In FIG. 3, an area shaded by diagonal dotted lines is an area where the bonding layer 40 is provided. As shown in FIG. 3, a part of the flexible printed wiring board 30 is disposed at the notch portion 40a of the bonding layer 40. At the notch portion 40a, there is positioned an area where the flexible printed wiring board 30 and the connection terminals 22a, 23a, 12a, and 13a are connected and bonded.

As shown in FIGS. 3 and 4, a space 61 formed by the notch portion 40a of the bonding layer 40, the transparent substrate 10, and the transparent glass substrate 20 is filled with an insulating layer 60 made of, for example, an epoxy resin. The insulating layer 60 is filled in a state where the flexible printed wiring board 30 and the connection terminals 22a, 23a, 12a, and 13a are connected. As the insulating layer 60, it is desirable to use one having excellent resistance to moisture. By using such a material, water such as moisture is not likely to penetrate between the pair of the transparent substrates constituting a touch panel, and accordingly it is possible to prevent the connection terminals from being corroded due to water. Further, as shown in FIG. 4, the insulating layer 60 is filled such that the inter-substrate distance P is equal between a bonding area 71 in which the bonding layer 40 is provided and a flexible-printed-wiring-board-disposing area 70 in which the flexible printed wiring board 30 is disposed without providing the bonding layer 40.

Next, a method of producing the touch panel 1 described above will be described.

First, the resistive films 11 and 21 made of ITO are deposited on the second surface 10b of the flexible transparent substrate 10 and the first surface 20a of the transparent glass substrate 20 by a known method such as a sputtering method. After that, on the second surface 10b of the flexible transparent substrate 10, the first upper electrode 12, the second upper electrode 13, the first upper connection terminal 12a, the second upper connection terminal 13a, and the upper wiring 12b that are made of silver are formed by a known method such as a screen printing method. Further, also on the first surface 20a of the transparent glass substrate 20, the first lower electrode 22, the second lower electrode 23, the first lower connection terminal 22a, the second lower connection terminal 23a, the first lower wiring 22b, and the second lower wiring 23b that are made of silver are formed by a known method such as a screen printing method.

Next, the transparent glass substrate 20 is disposed on a placing base with the first surface 20a side facing up, and the bonding layer 40 is placed so as to be positioned at the peripheral portion of the first surface 20a. After that, the flexible transparent substrate 10 is disposed on the transparent glass substrate 20 via the bonding layer 40 such that the second surface 10b is opposed to the first surface 20a of the transparent glass substrate 20, thus bonding the flexible transparent substrate 10 and the transparent glass substrate 20 by the bonding layer 40.

Figure 8:
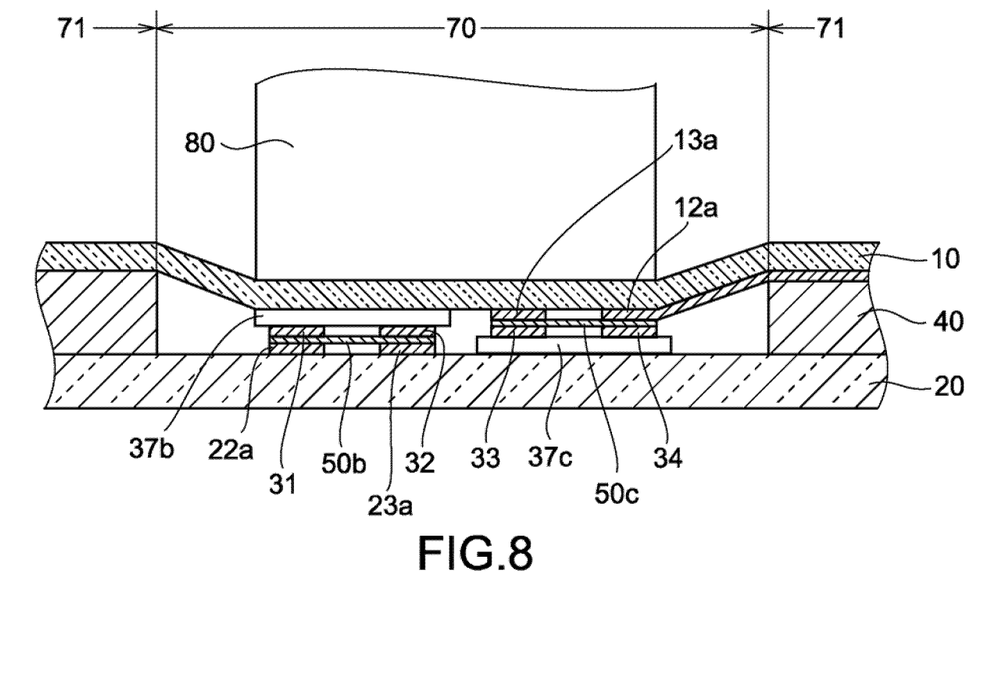
FIG. 8 A cross sectional view showing a bonding step of the flexible printed wiring board and connection terminals.
Figure 9:
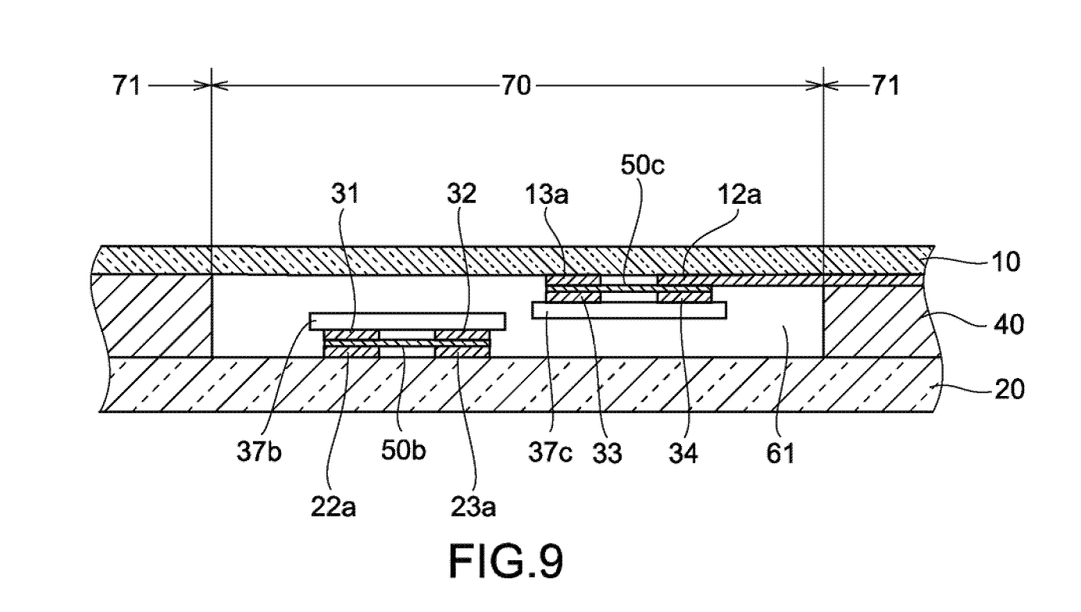
FIG. 9 A cross sectional view showing a state in which the flexible printed wiring board and the connection terminals are connected by bonding.

Next, the flexible printed wiring board 30 to which the ACFs 50b and 50c shown in FIG. 7 are provided is inserted into the gap between the two transparent substrates 10 and 20 in the flexible-printed-wiring-board-disposing area 70. After that, as shown in FIG. 8, the flexible-printed-wiring-board-disposing area 70 is pressed from the flexible transparent substrate 10 side using a pressure-bonding head 80, and thus the first lower connection terminal 22a and the second lower connection terminal 23a are connected by pressure-bonding to the first lower electrode terminal 31 and the second lower electrode terminal 32 via the ACF 50b, respectively, and the second upper connection terminal 13a and the first upper connection terminal 12a are connected by pressure-bonding to the second upper electrode terminal 33 and the first upper electrode terminal 34 via the ACF 50c, respectively. Accordingly, a touch panel having the space 61 formed by the notch portion 40a of the bonding layer 40 and the two transparent substrates 10 and 20 is formed in the flexible-printed-wiring-board-disposing area 70 as shown in FIG. 9.

Here, the flexible printed wiring board 30 is divided into the first connection area 37b and the second connection area 37c by the slit 37a, the first connection area 37b is electrically connected to the connection terminals 22a and 23a on the transparent glass substrate 20, and the second connection area 37c is electrically connected to the connection terminals 13a and 12a on the flexible transparent substrate 10. As described above, because the connection terminals provided on the different transparent substrates are connected by pressure-bonding to the different divided areas of the flexible printed wiring board 30, the flexible printed wiring board 30 is not pulled at a time of pressure-bonding connection and it is possible to prevent a connection failure between the connection terminals and the flexible printed wiring board 30 from occurring. That is, in a case where the connection terminals are provided on the different transparent substrates, bonding positions of the connection terminals and the flexible printed wiring board are different in a thickness direction of the transparent substrates. Therefore, if the slit is not provided on the flexible printed wiring board, the flexible printed wiring board is pulled due to the difference of the bonding positions, which may cause occurrence of a connection failure in some cases because a connection point of the connection terminals and the flexible printed wiring board deviates. In contrast to this, in this embodiment, because the slit is provided, the flexible printed wiring board is not pulled even when the difference in bonding positions is generated, and the connection failure can be prevented from occurring.

Then, in a state where the inter-substrate distance P of the flexible-printed-wiring-board-disposing area 70 is kept equal to the thickness of the bonding layer 40, the space 61 is filled with an insulating material made of an epoxy material using a nozzle and the like and after curing, the insulating layer 60 is formed. Accordingly, the touch panel 1 having the cross section shown in FIG. 4 can be obtained. The two transparent substrates 10 and 20 and the flexible printed wiring board 30 are firmly fixed by the insulating layer 60 while keeping a predetermined gap P. The inter-substrate distance P at a time of filling the insulating material is kept by placing the touch panel before the filling on a placing base and pressing the flexible-printed-wiring-board-disposing area 70 from the first surface 10a side of the flexible transparent substrate 10 by a flat plate. As the insulating material, a thermosetting resin, an ultraviolet curing resin, an anaerobic curing resin, and the like can be used.

As described above, in this embodiment, in areas corresponding to the connection terminals of the flexible printed wiring board before the insulating layer is provided, one transparent substrate opposed to the other transparent substrate on which the corresponding connection terminals are provided and the flexible printed wiring board are spaced away from each other. That is, in the areas corresponding to the connection terminals of the flexible printed wiring board, the flexible printed wiring board is firmly fixed by only the transparent substrate side on which the corresponding terminals are provided, and is not firmly fixed to the other transparent substrate. Accordingly, it becomes possible to control the gap between the pair of the transparent substrates in the area where the flexible printed wiring board is disposed to a desired gap. As a result, because it is possible to fix the gap to the desired gap by providing the insulating layer while keeping the gap between the pair of the transparent substrates in the area where the flexible printed wiring board is disposed to the desired gap, the gap between the pair of the transparent substrates can be made uniform in the plane of the touch panel.

Accordingly, it is possible to prevent Newton's rings and inputting errors from occurring and obtain a touch panel of an excellent quality. Further, because it is possible to fix the gap to the desired gap by providing the insulating layer while keeping the gap between the pair of the transparent substrates in the area where the flexible printed wiring board is disposed to the desired gap, a touch panel having a gap between the pair of the transparent substrates that is uniform in the plane of the touch panel can stably be produced even when the thickness of the flexible printed wiring board and the thickness of the ACFs are varied.

Figure 5:
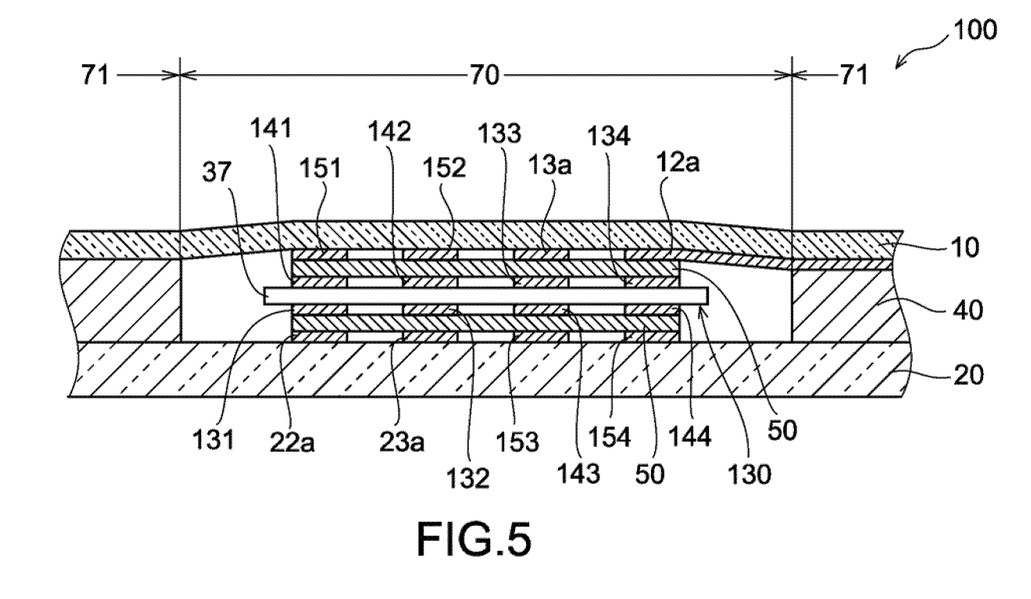
FIG. 5 A cross sectional view of a conventional touch panel.
Figure 6:
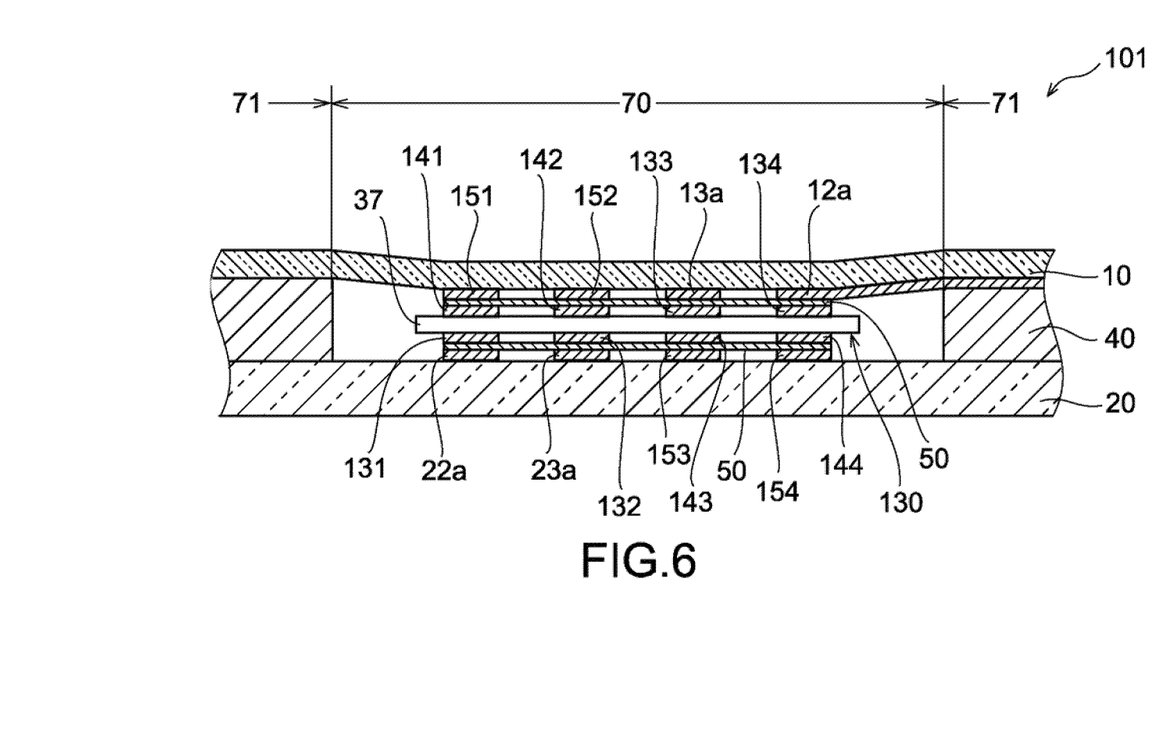
FIG. 6 A cross sectional view of another conventional touch panel.

Here, as described above, in the case where the connection terminals are provided on the different transparent substrates, bonding positions of the connection terminals and the flexible printed wiring board are different in a thickness direction of the transparent substrates. Therefore, if the slit is not provided on the flexible printed wiring board, the flexible printed wiring board is pulled due to the difference of the bonding positions, which may cause occurrence of a connection failure in some cases because a connection point of the connection terminals and the flexible printed wiring board deviates. In order to prevent such a connection failure from occurring, it is conceivable that without providing the slit on the flexible printed wiring board, dummy electrodes 151, 152, 153, and 154 are provided at positions corresponding to the connection terminals of the transparent substrates and dummy electrodes 141, 142, 143, and 144 are further provided at positions corresponding to electrodes of a flexible printed wiring board 130 as shown in FIGS. 5 and 6 such that bonding positions become equal in the thickness direction of the transparent substrates. However, there may be a case where the thicknesses of the ACFs 50 are varied, and an inter-substrate distance of the flexible-printed-wiring-board-disposing area 70 is thicker than a desired thickness to thereby cause a partially-bulged surface of a touch panel 100 as shown in FIG. 5 or the inter-substrate distance of the flexible-printed-wiring-board-disposing area 70 is thinner than the desired thickness to thereby cause a partially-concaved surface of a touch panel 101 as shown in FIG. 6. Thus, it is difficult to control the gap between the pair of the transparent substrates in the area where the flexible printed wiring board is disposed. In contrast to this, in this embodiment, a touch panel having a gap between the pair of the transparent substrates that is uniform in the plane the touch panel can stably be obtained even when the thicknesses of the ACFs are varied, for example, as described above. It should be noted that FIGS. 5 and 6 are cross sectional views of a touch panel in the vicinity of the area where the flexible printed wiring board is disposed, in which structures similar to the structures described above are denoted by similar reference symbols and descriptions thereof are omitted.

Moreover, in this embodiment, each of the pair of the transparent substrates 10 and 20 is provided with the connection terminals. However, there may be adopted a structure in which the connection terminals are collectively provided on one of the transparent substrates and the connection terminals that are electrically connected to the resistive film provided on the other transparent substrate obtain conduction by the corresponding resistive film and a conductive material provided between the pair of the transparent substrates. As described above, also in the case where one of the transparent substrates is collectively provided with the connection terminals, the transparent substrate opposed to the transparent substrate provided with the connection terminals and the flexible printed wiring board are spaced apart from each other, and by providing the insulating layer while keeping the gap between the pair of the transparent substrates in the area where the flexible printed wiring board is disposed after the connection terminals and the flexible printed wiring board are connected by bonding, it is possible to stably obtain a touch panel having a gap between the pair of the transparent substrates that is uniform in the plane of the touch panel.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A touch panel comprising:
   first and second transparent substrates positioned opposed to and away from each other, each transparent substrate having opposed first and second surfaces respectively;
   a resistive film formed on an input area of each of the first and second transparent substrates;
   first opposed electrodes formed on the first transparent substrate and second opposed electrodes formed on the second transparent substrate, the first opposed electrodes and second opposed electrodes being connected to opposed sides of the respective resistive film;
   first connection terminals provided on the second surface of the first transparent substrate facing the second transparent substrate at terminal ends of the first opposed electrodes, and second connection terminals provided on the first surface of the second transparent substrate facing the first transparent substrate at terminal ends of the second opposed electrodes;
   a wiring substrate that is disposed between the first and second transparent substrates and has a first wiring substrate surface electrically connected to the second connection terminals, and a second wiring substrate surface opposed to the first wiring substrate surface and electrically connected to the first connection terminals; and an insulating layer filled in gaps between the first wiring substrate surface and the first substrate and between the second wiring substrate surface and the second substrate, wherein the insulating material is provided between the first and second substrates to connect the first substrate to the second substrate, and to connect the wiring substrate to the first connection terminals and the second terminals.

2. The touch panel according to claim 1, further comprising a frame-like bonding layer that is disposed between the pair of transparent substrates and bonds the pair of transparent substrates to each other, wherein the bonding layer includes, at an outer peripheral portion thereof, a notch portion corresponding to the wiring substrate, and wherein the insulating layer is filled in a space formed by the pair of transparent substrates and the notch portion of the bonding layer.

3. The touch panel according to claim 2, wherein the wiring substrate is structured by being divided into a first connection area that is connected to the first connection terminal and a second connection area that is connected to the second connection terminal.

4. The touch panel according to claim 2, wherein the touch panel is a resistive touch panel.

5. A method of producing a touch panel, the method comprising:

providing first and second transparent substrates positioned opposed to and away from each other, each transparent substrate having opposed first and second surfaces respectively;

forming a resistive film on an input area of each of the first and second transparent substrates;

forming first opposed electrodes on the first transparent substrate and forming second opposed electrodes on the second transparent substrate, the first opposed electrodes and second opposed electrodes being connected to opposed sides of the respective resistive film;

forming first connection terminals on the second surface of the first transparent substrate facing the second transparent substrate at terminal ends of the first opposed electrodes, and forming second connection terminals on the first surface of the second transparent substrate facing the first transparent substrate at terminal ends of the second opposed electrodes;

disposing a wiring substrate between the first and second transparent substrates and has a first wiring substrate surface electrically connected to the second connection terminals, and a second wiring substrate surface opposed to the first wiring substrate surface and electrically connected to the first connection terminals; and filling an insulating layer in gaps between the first wiring substrate surface and the first substrate and between the second wiring substrate surface and the second substrate, wherein the insulating material is provided between the first and second substrates to connect the first substrate to the second substrate, and to connect the wiring substrate to the first connection terminals and the second terminals.

* * * * *